US012668695B2

(12) United States Patent
De Freitas

(10) Patent No.: US 12,668,695 B2
(45) Date of Patent: Jun. 30, 2026

(54) POLYMER BLENDS AND METHOD FOR MAKING THE SAME

(71) Applicant: Aires Mauro De Freitas, Itanhaem (BR)

(72) Inventor: Aires Mauro De Freitas, Itanhaem (BR)

( * ) Notice: Subject to any disclaimer, the term of this patent is extended or adjusted under 35 U.S.C. 154(b) by 763 days.

(21) Appl. No.: 18/026,973

(22) PCT Filed: Sep. 17, 2021

(86) PCT No.: PCT/IB2021/058496
§ 371 (c)(1),
(2) Date: Mar. 17, 2023

(87) PCT Pub. No.: WO2022/058954
PCT Pub. Date: Mar. 24, 2022

(65) Prior Publication Data
US 2023/0340249 A1 Oct. 26, 2023

(30) Foreign Application Priority Data
Sep. 18, 2020 (EP) ..................................... 20196961

(51) Int. Cl.

| | |
|---|---|
| C08L 55/02 | (2006.01) |
| B29C 48/00 | (2019.01) |
| B29C 48/04 | (2019.01) |
| B29C 48/395 | (2019.01) |
| B29C 48/40 | (2019.01) |
| C08G 63/183 | (2006.01) |
| C08J 9/00 | (2006.01) |
| C08K 5/053 | (2006.01) |
| B29K 55/02 | (2006.01) |
| B29K 67/00 | (2006.01) |

(52) U.S. Cl.
CPC ............ C08L 55/02 (2013.01); B29C 48/022 (2019.02); B29C 48/04 (2019.02); B29C 48/397 (2019.02); B29C 48/40 (2019.02); C08G 63/183 (2013.01); C08J 9/0061 (2013.01); C08K 5/053 (2013.01); B29C 2948/92561 (2019.02); B29C 2948/92704 (2019.02); B29K 2055/02 (2013.01); B29K 2067/003 (2013.01); B29K 2067/006 (2013.01); C08J 2375/06 (2013.01); C08L 2203/14 (2013.01); C08L 2203/30 (2013.01); C08L 2205/025 (2013.01); C08L 2205/03 (2013.01); C08L 2207/20 (2013.01)

(58) Field of Classification Search
CPC .. C08L 55/02; C08L 2203/14; C08L 2203/30; C08L 2205/025; C08L 2205/03; C08L 2207/20; C08L 67/02; B29C 48/022; B29C 48/04; B29C 48/397; B29C 48/40; B29C 2948/92561; B29C 2948/92704;
C08G 63/183; C08G 18/4202; C08G 18/4213; C08G 2110/00; C08J 9/0061; C08J 2375/06; C08K 5/053; B29K 2055/02; B29K 2067/003; B29K 2067/006
See application file for complete search history.

(56) References Cited

FOREIGN PATENT DOCUMENTS

| | | | |
|---|---|---|---|
| JP | 6 668768 | B2 | 3/2020 |
| JP | 6668768 | * | 3/2020 |

OTHER PUBLICATIONS

Luo (Luo, X. et al., Synthesis and Characterization of Polyols and Polyurethane Foams from PET Waste and Crude Glycerol, Journal of Polymers and the Environment, 2014, 22(39), 318-328).*
Vaidya (Vaidya et al., Polyester Polyols for Polyurethanes from PET Waste: Kinetics of Polycondensation, Journal of Applied Polymer Science, 1988, 35(3), 775-785).*
International Search Report (PCT/ISA/210) issued in PCT Application No. PCT/IB2021/058496 dated Nov. 25, 2021 (three (3) pages).
Written Opinion (PCT/ISA/237) issued in PCT Application No. PCT/IB2021/058496 dated Nov. 25, 2021 five (5) pages).
U. R. Vaidya et al., "Polyester Polyols for Polyurethanes from PET Waste: Kinetics of Polycondensation", Journal of Applied Polymer Science, Feb. 20, 1998, vol. 35, No. 3, pp. 775-785, XP55560780AI, (11 pages).
Luo Xiaolan et al., "Synthesis and Characterization of Polyols and Polyurethane Foams from PET Waste and Crude Glycerol", Journal of Polymers and the Environment, Feb. 9, 2014, pp. 318-328, vol. 22, No. 3, XP55773375AI, (12 pages).
Vaidya et al., "Polyester Polyols from Glycolyzed PET Waste: Effect of Glycol Type on Kinetics of Polyesterification", Journal of Applied Polymer Science, 1989, pp. 1179-1190, vol. 38 (12 pages).
Gintis D., "Glycolytic Recycle of Poly (Ethylene Terephthalate) (PET)", Makromol. Chem., Macromol. Symp., 1992, pp. 185-190, vol. 57 (7 pages).
Rossi et al., "Flexible Polyurethane Foams from Recycled PET", Progress in Rubber, Plastics and Recycling Technology, 2003, pp. 51-60, vol. 19, No. 1 (10 pages).
Wolf et al., "Plastics, Additives", Ullmann's Encyclopedia of Industrial Chemistry, 2011, pp. 619-671, vol. 27 (53 pages).
"Polyesters", Ullmann's Encyclopedia of Industrial Chemistry 7th Edition, 2011, pp. 636, vol. 28 (1 page).
"Polyesters", Ullmann's Encyclopedia of Industrial Chemistry 7th Edition, 2011, pp. 628, vol. 58 (1 page).

* cited by examiner

*Primary Examiner* — Kumar R Bhushan
(74) *Attorney, Agent, or Firm* — Crowell & Moring LLP

(57) ABSTRACT

The present invention pertains to solid polymer blends obtainable from starting materials comprising glycerine, an ABS polymer, a PBT polymer, a PET polymer, and optionally polymer additives. Further, the present invention pertains to particles of the polymer blend and their use for the manufacture of polyurethanes, in particular, polyurethane foams.

20 Claims, No Drawings

POLYMER BLENDS AND METHOD FOR MAKING THE SAME

CROSS-REFERENCE TO RELATED APPLICATIONS

This application is the U.S. National Stage application of PCT Application No. PCT/IB/2021/058496, filed on Sep. 17, 2021, which claims priority to European Application No. 20196961.5, filed on Sep. 18, 2020, the contents of which are each incorporated herein by reference in their entirety.

TECHNICAL FIELD

The present invention relates to a solid polymer blend product obtainable from glycerine, an ABS polymer, a PBT polymer, a PET polymer, and optionally, polymer additives. Further, the present invention is directed to said solid polymer blend products in micronized form, as well as to the use thereof as reactive components for the manufacture of polyurethanes.

TECHNOLOGICAL BACKGROUND

The recycling of plastic materials becomes more and more important for the plastic producing and processing industry. Various methods for recycling have been designed and reported for different types of plastic materials (in short: "plastics").

A well-established type of plastic is the polyester material known as polyethylene terephthalate or PET, which is obtainable by polycondensation reaction of the dihydric alcohol ethylene glycol with the dicarboxylic acid terephthalic acid. Originally developed for the use in the field of fibers and filaments, PET has become an important raw material in the field of packaging and wrapping materials. Due to its advantageous properties (such as low permeability for gases and resistance to temperatures up to about 100° C. for continuous exposition and up to 200° C. for short-term exposition), PET nowadays is a very popular material for the manufacture of bottles for beverages, such as soft drinks.

Another advantageous property of PET is the ease of recycling processes applicable for that material, at least for waste and scrap materials consisting of relatively pure PET. While the highest grade of quality may be subjected to direct remelting extrusion in the conventional forming processes (optionally after drying), it is also relatively simple to subject the waste PET to de-polycondensation processes, resulting in the same raw materials as used for the polycondensation of the polymeric product (i.e., glycol and terephthalic acid or esters of terephthalic acid). Such processes are referred to as hydrolysis or alcoholysis (glycolysis, methanolysis) of PET. These methods and processes are well-known in the art.

In addition, it has been described to subject scrap PET to partial alcoholysis with dihydric alcohols such as ethylene glycol, propylene glycol, diethylene glycol or 1,4-butanediol to obtain oligomeric diols (also called "polyester polyols") having a lower molecular weight compared to the PET starting material, which are further used as raw material for the production of new plastic materials. In particular, such polyester polyols were employed as polyol raw materials in the manufacture of polyurethanes. Corresponding methods and processes were described, e.g., in the publications of U. R. Vaidya and V. M. Nadkarni in *Journal of Applied Polymer Science* 1988, 35, 775-785, and *Journal of Applied Polymer*

*Science* 1989, 38, 1179-1190, as well as by Rossi et al. in *Progress in Rubber, Plastics and Recycling Technology* 2003, 19(1), 51-60.

It was further known in the art that specific polyester polyols for the use as reactive intermediates in the manufacture of polyurethane plastics can be obtained by targeted synthesis of the respective polyester polyols from the respective monomers. See. e.g., *Ullmann's Encyclopedia of Industrial Chemistry*, 7th edition, Wiley-VCH, Weinheim 2011, Volume 28, chapter "Polyesters", p. 628. However, these specific polyester polyols are characterized by the use of saturated aliphatic dicarboxylic acids (such as adipic acid) as monomers.

A typical reactor for glycolysis of PET is shown, e.g., by D. Gintis in *Makromolekulare Chemie, Macromolecular Symposia* 1992, 57, 185-190. As it can be derived thereof, glycolysis of PET is performed as a batch or continuous process in a stirred vessel reactor. Moreover, it is typically a goal of this kind of recycling reaction to arrive at polyester polyols having a low molecular weight, resulting in semi-solid or liquid products that are easy to purify (e.g., by distillation or filtration) and feed into the reactant flow of further reactors downstream the respective synthetic sequence.

However, the recycling of PET by partial or total alcoholysis is an energy- and time-consuming process. Thus, there is a need in the art to provide alternative materials and/or methods and/or uses for which scrap PET may be used as a raw material. In contrast to the materials and methods known in the art, the present invention does not involve alcoholysis of PET.

It was surprisingly found by the inventors of the present invention that PET (including scrap PET) can be successfully employed for the manufacture of solid polymer blend compositions that are particularly useful in the context of polyol substitutes for the manufacture of polyurethane products. Without wishing to be bound to any theory, it is assumed that the use of the trihydric alcohol glycerol in the process of manufacturing the polymer blends of the invention leads to a partial alcoholysis of the PET, resulting in an introduction of potentially reactive hydroxyl groups into the polymer backbone. These hydroxyl groups are maintained during the further processing steps, resulting in a corresponding reactivity of the polymer blend compositions as well as of micronized polymer blend.

Further, it was surprisingly found by the inventors that the micronized polymer blend compositions of the invention can be advantageously used in the manufacture of polyurethane products, in particular, polyurethane foams. As explained before, the polymer blends of the invention, in particular in micronized form, show hydroxyl groups on the surfaces thereof, resulting in a corresponding reactivity of the solid particles. In the field of polyurethane synthesis, said reactivity results in the ability of the solid particles to be incorporated by means of a chemical reaction between the isocyanate compound(s) required for the formation of polyurethanes on one hand, and the hydroxyl functions exposed at the surfaces of the micronized polymer blends on the other hand. It is therefore immediately evident that the polymer blends of the present invention may serve as a substitute for polyol components as frequently used in the synthesis of polyurethanes. When doing so, the microparticles of the polymer blend composition will form a substantive part of the network of polyurethane macromolecules generated in said reaction included by the formation of covalent chemical bonds, instead of acting as inert solid fillers, i.e., solid particles that are merely surrounded by the network of polyurethane macromolecules.

Further, it was surprisingly found by the inventors that the polymer blend compositions of the present invention show improved properties due to the inclusion of certain amounts of additional polymer components, in particular an acrylonitrile-butadiene-styrene (ABS) copolymer as well as polybutylene terephthalate (PBT), into the polymer blend. In particular, it was found that the presence of ABS has a direct influence on the elasticity as well as of the hardness of a polyurethane foam that is manufactured.

SUMMARY OF THE INVENTION

It is an object of the present invention to provide a solid polymer blend product, wherein said polymer blend product is obtainable by a process comprising the steps of
a) providing a mixture of starting materials comprising:
    0.5 to 7 percent by weight of glycerine;
    5 to 25 percent by weight of an ABS (acrylonitrile-butadiene-styrene) copolymer;
    5 to 25 percent by weight of a PBT (polybutylene terephthalate) polymer;
    48 to 89.5 percent by weight of a PET (polyethylene terephthalate) polymer; and
    0 to 5 percent by weight of one or more polymer additives;
  wherein the sum of the amounts of the components listed above is 100 percent by weight;
b) subjecting the mixture from step (a) to an extrusion process at elevated temperatures;
c) cooling and granulating the product from step (b) into a granulate; and optionally
d) subjecting the granulate from step (c) to a milling step to obtain the product in the form of particles having a mean average particle size of from 1 µm to 250 µm, or from 1 µm to 25 µm, or 1 µm to 10 µm, or 8 µm to 10 µm.

In a further aspect of the invention, the ABS copolymer in the starting material of step (a) is selected from the group consisting of ABS blend type polymer or ABS graft polymer.

In a further aspect of the invention, the polymer additives in the starting material of step (a) are selected from the group consisting of antioxidants, light stabilizers, lubricants, flame retardants, fillers, dyes, or pigments.

In a further aspect of the invention, the PET polymer in the starting material of step (a) is a commercially available PET having a molecular weight ($M_w$) in the range of from 20,000 to 100,000, or from 20,000 to 90,000, or from 40,000 to 85,000, which is optionally a recycled PET or scrap PET.

The average molecular weight $M_w$ of PET as given above is frequently determined as known to a person skilled in the art by applying the method of determining the specific viscosity of a solution or melt of the respective PET in a capillary viscometer. See. e.g., *Ullmann's Encyclopedia of Industrial Chemistry, 7th* edition, Wiley-VCH, Weinheim 2011, Volume 28, chapter "Polyesters", p. 636. Alternatively, the method of size exclusion chromatography coupled with light-scattering detection (SEC-LS) according to ISO16014-5:2019, may be applied.

In a further aspect of the invention, the extrusion process of step (b) is performed at a temperature in the range from 150 to 280° C., or 170 to 190° C.

In a further aspect of the invention, the elevated temperature during the extrusion step (b) is maintained for 10 minutes or less, or 5 minutes or less, or 3 minutes or less.

In a further aspect of the invention, the extrusion process of step (b) is performed with a heatable single-screw extruder, or a heatable twin-screw extruder.

In a further aspect of the invention, the milling step in step (d) comprises jet-milling of the granulate obtained in step (c) with a jet mill, and wherein the jet mill is selected from an opposed jet mill or a fluidized-bed jet mill.

It is a further object of the present invention to provide a process for the preparation of a solid polymer blend product as described above, the process comprising the steps of
a) providing a mixture comprising:
    0.5 to 7 percent by weight of glycerine;
    5 to 25 percent by weight of an ABS (acrylonitrile-butadiene-styrene) copolymer;
    5 to 25 percent by weight of a PBT (polybutylene terephthalate) polymer;
    48 to 89.5 percent by weight of a PET (polyethylene terephthalate) polymer; and
    0 to 5 percent by weight of one or more polymer additives;
  wherein the sum of the amounts of the components listed above is 100 percent by weight;
b) subjecting the mixture from step (a) to an extrusion process at elevated temperatures;
c) cooling and granulating the product from step (b) into a granulate; and optionally
d) subjecting the granulate from step (c) to a milling step to obtain the product in the form of particles having a mean average particle size of from 1 µm to 200 µm, or from 1 µm to 25 µm, or 1 µm to 10 µm, or 8 µm to 10 µm.

In a further aspect of the process of the invention, the extrusion process of step (b) is performed at a temperature in the range from 150 to 280° C., or 170 to 190° C.

In a further aspect of the process of the invention, the elevated temperature during the extrusion step (b) is maintained for 10 minutes or less, or 5 minutes or less, or 3 minutes or less.

In a further aspect of the process of the invention, the extrusion process of step (b) is performed with a heatable single-screw extruder, or a heatable twin-screw extruder.

In a further aspect of the process of the invention, the milling step in step (d) comprises jet-milling of the granulate obtained in step (c) with a jet mill, and wherein the jet mill is selected from an opposed jet mill or a fluidized-bed jet mill.

In a further aspect, the present invention encompasses the use of the solid polymer blend product according to any of the embodiments described above or the manufacture of polyurethane components comprising reacting the solid polymer blend product particles with suitable isocyanate compound(s) and optionally further suitable polyol compound(s).

DETAILED DESCRIPTION OF PREFERRED EMBODIMENTS

In the following, the invention will be explained in more detail.

The polymer blend product according to the invention is prepared from as starting material comprising glycerine; an ABS (acrylonitrile-butadiene-styrene) copolymer; a PBT (polybutylene terephthalate) polymer; a PET (polyethylene terephthalate) polymer; and optionally additional polymer additives; wherein the sum of the amounts of the components listed above is 100 percent by weight.

In one embodiment, the amount of glycerine in the product is from 0.5 to 7.0 percent by weight. In another embodiment, the amount is from 1.0 to 5.0 percent by weight. In a further embodiment, the amount is from 1.0 to 2.0 percent by weight. In yet another embodiment, the amount is from 1.5 to 2.0 percent by weight.

In one embodiment, the amount of the ABS polymer is from 5 to 25 percent by weight. In another embodiment, the amount is from 5 to 15 percent by weight. In yet another embodiment, the amount is or from 5 to 10 percent by weight.

In one embodiment, the amount of the PBT polymer is from 5 to 25 percent by weight. In another embodiment, the amount is from 5 to 15 percent by weight. In yet another embodiment, the amount is or from 5 to 10 percent by weight.

In one embodiment, the amount of the PET polymer is from 48 to 89.5 percent by weight. In another embodiment, the amount is from 60 to 89.5 percent by weight. In yet another embodiment, the amount is or from 70 to 89.5 percent by weight. In yet another embodiment, the amount is from 70 to 88 percent by weight.

The PET used in the invention can be a commercially available PET having a molecular weight in the range of 20,000 to 100,000; or from 40,000 to 85,000. These ranges of molecular weight are met by PET materials suitable for the most relevant technical applications, such as, e.g., the manufacture of PET fibers or PET bottles. In one embodiment of the invention, the PET educt used in step a) is obtained by recycling of PET scrap, such as recollected PET bottles, which is subjected to the usual purification steps known in the art for obtaining PET scrap for recycling (e.g., removal of labels and contaminations with other plastics).

ABS (acrylonitrile-butadiene-styrene) is a copolymer that is well-known to the skilled person, and which is thought to provide the following advantageous properties: high mechanical resistance (stiffness, hardness, impact strength), high resistance against fluctuation of temperatures, high chemical resistance, and high resistance to deformation. The ABS (acrylonitrile-butadiene-styrene) copolymer used for the invention can be ABS blend type polymer or ABS graft polymer. In one embodiment, the ABS educt used in step a) is obtained by recycling of ABS scrap, which is subjected to the usual purification steps known in the art for obtaining ABS scrap for recycling (e.g., removal of labels and contaminations with other plastics).

PBT (polybutylene terephthalate) is a polymer that is well-known to the skilled person, and which is thought to provide the following advantageous properties: high mechanical resistance (stiffness, impact strength), high resistance against fluctuation of temperatures, and high resistance to deformation. The PBT (polybutylene terephthalate) polymer used for the invention can be any conventional type of commercially available PBT. In one embodiment, the PBT educt used in step a) is obtained by recycling of PBT scrap, which is subjected to the usual purification steps known in the art for obtaining PBT scrap for recycling (e.g., removal of labels and contaminations with other plastics).

The additives used for the invention can be polymer additives antioxidants, light stabilizers, lubricants, flame retardants, fillers, dyes, or pigments, or combinations thereof. Suitable additives are known to the person skilled in the art, and are described in some detail, e.g., in *Ullmann's Encyclopedia of Industrial Chemistry*, 7$^{th}$ edition, Wiley-VCH, Weinheim 2011, Volume 27, chapter "Plastics, Additives", pp. 619-671. In one embodiment, the amount the one or more additives in the polymer blend product is from 0 to 5 percent by weight. In another embodiment, the amount is from 0 to 2 percent by weight.

The invention further comprises a process for the preparation of the polymer blend products described above, said process comprising the steps of (a) providing a mixture comprising glycerine; an ABS (acrylonitrile-butadiene-styrene) copolymer; a PBT (polybutylene terephthalate) polymer; a PET (polyethylene terephthalate) polymer; and optionally additional polymer additives; wherein the sum of the amounts of the components listed above is 100 percent by weight.

In one embodiment, the amount of glycerine in the mixture of step (a) is from 0.5 to 7.0 percent by weight. In another embodiment, the amount is from 1.0 to 5.0 percent by weight. In a further embodiment, the amount is from 1.0 to 2.0 percent by weight. In yet another embodiment, the amount is from 1.5 to 2.0 percent by weight.

In one embodiment, the amount of the ABS polymer in the mixture of step (a) is from 5 to 25 percent by weight. In another embodiment, the amount is from 5 to 15 percent by weight. In yet another embodiment, the amount is or from 5 to 10 percent by weight.

In one embodiment, the amount of the PBT polymer in the mixture of step (a) is from 5 to 25 percent by weight. In another embodiment, the amount is from 5 to 15 percent by weight. In yet another embodiment, the amount is or from 5 to 10 percent by weight.

In one embodiment, the amount of the PET polymer in the mixture of step (a) is from 48 to 89.5 percent by weight. In another embodiment, the amount is from 60 to 89.5 percent by weight. In yet another embodiment, the amount is or from 70 to 89.5 percent by weight. In yet another embodiment, the amount is from 70 to 88 percent by weight.

In one embodiments, the mixing of step (a) might be performed by using glycerine, ABS, PBT, PET and optionally one or more additives as feeding stocks for a conventional extruder for polymeric materials. Alternatively, any of the components listed might be used in the form of pre-mixtures which are then used as feeding stock(s) for the extruder. In both cases, the extruder is also used to perform the extrusion process at elevated temperatures according to step (b).

In one embodiment, a heatable single-screw extruder is used for performing the extrusion step at elevated temperatures of step (b). In another embodiment, a heatable twin-screw extruder is used for the same purpose.

In one embodiment, the extrusion process of step (b) is performed at a temperature in the range from 150 to 250° C. In another embodiment, the extrusion process is performed at a temperature in the range from 170 to 190° C.

The time period for which the elevated temperature is applied during the extrusion step (b) can be controlled, e.g., by variation of the extrusion speed, or in other words, by varying the time required for a given portion of the mixture to pass through the heated section of the extruder. In one embodiment of the invention, the elevated temperature of step (b) is maintained for 10 minutes or less. In another embodiment, the elevated temperature of step (b) is maintained for 5 minutes or less. In yet another embodiment, the elevated temperature of step (b) is maintained for 3 minutes or less. In still another embodiment, the elevated temperature of step (b) is maintained for 2 minutes.

It is a goal of the present invention to select the extrusion temperature and time in a manner that homogenization of the compounds of the mixture is obtained.

In step (c) according to the process of the present invention, the extruded product is cooled to ambient temperature by suitable means known in the art, e.g., by cooling the extruded product in a water bath or in a stream of cold gas (air). Further, the extruded product is subjected to grinding by conventional means, such as, e.g., a hammer mill, a ball mill, or a cutting mill, to obtain a granulated product. In one embodiment of the invention, the particle size of the granulate obtained from step (c) is in the range of 1 to 10 millimeters. In another embodiment, the particle size of the granulate obtained from step (c) is in the range of 2 to 5 millimeters. The particle size can be determined, e.g., by applying conventional analytical sieving.

The granulated polymer blend products obtained from step (c) may be subjected to further particle size reduction by jet-milling. In one embodiment of the invention, the jet-milling of step (d) leads to a polyester product having an average particle size within a range from 0.1 µm to 200 µm. In another embodiment, the average particle size is within a range from 1 µm to 25 µm. In yet another embodiment, the average particle size is within a range from 1 µm to 10 µm. In still another embodiment, the average particle size is within a range from 8 µm to 10 µm.

The average particle sized mentioned above can be obtained by subjecting the granulate from step (c) to a step of jet-milling in a milling equipment such as an opposed jet mill or a fluidized jet mill.

The average particle size as given above can be determined by applying the method of laser diffraction according to ISO13320/2009. Alternatively, conventional analytical sieving methods can be applied where appropriate (e.g., for larger particle sizes).

The fine particles obtained from step (d) are useful for the manufacture of polyurethane components, wherein the polymer blend particles serve as the polyol component in a conventional reaction with suitable isocyanate compounds to form polyurethane components. In such a reaction, the particles of the solid polymer blend of the present invention serve as reactive polyol components due to the presence of free hydroxyl groups at the surface, the presence of which is due to the reaction of glycerine with PET. In particular, it was found that the fine particles obtained from step (d) are useful for the manufacture of polyurethane foams. Polyurethane foams manufactured by use of the solid polymer blend particles according to the invention may be advantageously applied, e.g., in the manufacture of mattresses and the like (soft foams) as well as thermal insulation foams (hard foams). However, the use is not limited to these classes of polyurethane products. The mechanical properties of the polyurethane products, and in particular, of the polyurethane foams obtained by using the solid polymer blend of the present invention in the form of microparticles can be further adapted by selecting the amount and properties of the ABS and PBT components of the blend.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

The invention claimed is:

1. A solid polymer blend product obtainable by a process consisting of the following steps:
   a) providing a mixture comprising:
   0.5 to 7 percent by weight of glycerine;
   5 to 25 percent by weight of an ABS (acrylonitrile-butadiene-styrene) copolymer;
   5 to 25 percent by weight of a PBT (polybutylene terephthalate) polymer;
   48 to 89.5 percent by weight of a PET (polyethylene terephthalate) polymer; and
   0 to 5 percent by weight of polymer additives;
   wherein the sum of the amounts of the components listed above is 100 percent by weight;
   b) subjecting the mixture from step (a) to an extrusion process at elevated temperatures;
   c) cooling and granulating the product from step (b) into a granulate; and
   optionally
   d) subjecting the granulate from step (c) to a milling step to obtain the product in the form of particles having a mean average particle size of from 0.1 µm to 200 µm.

2. The polymer blend product according to claim 1, wherein the ABS copolymer is selected from the group consisting of ABS blend type polymer or ABS graft polymer.

3. The polymer blend product according to claim 1, wherein the polymer additives are selected from the group consisting of antioxidants, light stabilizers, lubricants, flame retardants, fillers, dyes, or pigments.

4. The polymer blend product according to claim 1, wherein the PET polymer is a commercially available PET having a molecular weight (Mw) in the range of from 20,000 to 100,000.

5. The polymer blend product according to claim 4, wherein the PET polymer is a recycled PET or a scrap PET.

6. The polymer blend product according to claim 1, wherein the product is present in the form of micronized particles with a mean average particle size of from 0.1 µm to 200 µm.

7. The polymer blend product according to claim 1, wherein the product is present in the form of micronized particles with a mean average particle size of from 1 µm to 25 µm.

8. A process for the preparation of a solid polymer blend product according to claim 1, the process comprising the steps of:
   a) providing a mixture comprising:
   0.5 to 7 percent by weight of glycerine;
   5 to 25 percent by weight of an ABS (acrylonitrile-butadiene-styrene) copolymer;
   5 to 25 percent by weight of a PBT (polybutylene terephthalate) polymer;
   48 to 89.5 percent by weight of a PET (polyethylene terephthalate) polymer; and
   0 to 5 percent by weight of polymer additives;
   wherein the sum of the amounts of the components listed above is 100 percent by weight;
   b) subjecting the mixture from step (a) to an extrusion process at elevated temperatures;
   c) cooling and granulating the product from step (b) into a granulate; and
   optionally
   d) subjecting the granulate from step (c) to a milling step to obtain the product in the form of particles having a mean average particle size of from 0.1 µm to 200 µm.

9. The process according to claim 8, wherein the extrusion process of step (b) is performed at a temperature in the range from 150 to 250° C.

10. The process according to claim 8, wherein the extrusion process of step (b) is performed at a temperature in the range from 170 to 190° C.

11. The process according to claim 8, wherein the elevated temperature during the extrusion step (b) is maintained for 10 minutes or less.

12. The process according to claim 8, wherein the elevated temperature during the extrusion step (b) is maintained for 5 minutes or less.

13. The process according to claim 8, wherein the elevated temperature during the extrusion step (b) is maintained for 3 minutes or less.

14. The process according to claim 8, wherein the extrusion process of step (b) is performed with a heatable single-screw extruder.

15. The process according to claim 8, wherein the extrusion process of step (b) is performed with a heatable twin-screw extruder.

16. The process according to claim 8, wherein the milling step in step (d) comprises jet-milling of the granulate obtained in step (c) with a jet mill, and wherein the jet mill is an opposed jet mill.

17. The process according to claim 8, wherein the milling step in step (d) comprises jet-milling of the granulate obtained in step (c) with a jet mill, and wherein the jet mill is a fluidized-bed jet mill.

18. A process for producing polyurethanes comprising reacting a solid polymer blend product of claim 1 with isocyanates.

19. The process according to claim 18, further comprising including polyols.

20. The process according to claim 18, wherein the polyurethane is a polyurethane foam.

* * * * *